United States Patent
Fusegi et al.

(10) Patent No.: US 6,827,661 B2
(45) Date of Patent: Dec. 7, 2004

(54) CLUTCH SYSTEM AND DIFFERENTIAL WITH SAME

(75) Inventors: Masaaki Fusegi, Tochigi (JP); Masashi Aikawa, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/374,622

(22) Filed: Feb. 25, 2003

(65) Prior Publication Data

US 2003/0162622 A1 Aug. 28, 2003

(30) Foreign Application Priority Data

Feb. 28, 2002 (JP) ........................................ 2002-053741

(51) Int. Cl.⁷ .............................................. F16H 48/30
(52) U.S. Cl. ...................................................... 475/150
(58) Field of Search ...................... 192/69.8, 35, 85.92, 192/84.7; 475/150

(56) References Cited

U.S. PATENT DOCUMENTS 2,962,142 A * 11/1960 Straub Hermann W .... 192/84.2
6,551,209 B2 * 4/2003 Cheadle et al. ............. 475/150
2002/0019284 A1 * 2/2002 Aikawa et al. ............. 475/150
2002/0155913 A1 * 10/2002 Fusegi et al. ............... 475/150

FOREIGN PATENT DOCUMENTS

JP               05-54574              8/1993

* cited by examiner

*Primary Examiner*—Dirk Wright
(74) *Attorney, Agent, or Firm*—Morrison & Foerster LLP (57) ABSTRACT

The differential (13) includes a clutch system. The clutch system includes a clutch (41a, 43a) for being displaced to establish engagement thereof. The clutch system includes an actuator (61) for operating the clutch. The actuator includes a solenoid (63). The actuator a plunger (65, 67, 73) driven by the solenoid for giving a displacement to the clutch. The differential includes a rotatable driving member (31). The differential includes a differential mechanism (45, 49, 51 and 53) driven by the driving member. The clutch interlocks the driving member and the differential mechanism with each other.

13 Claims, 9 Drawing Sheets

CLUTCH SYSTEM AND DIFFERENTIAL WITH SAME

BACKGROUND OF THE INVENTION

The present invention relates to a clutch system, and specifically, to a differential with the clutch system adapted for a vehicle.

A related differential is disclosed in a publication after examined patent application of NO. Hei 5-54574. The differential is adapted to a front differential of a part-time four-wheel drive vehicle.

The differential employs a cylinder as an actuator for engaging or disengaging of a dog clutch. The elongating of the cylinder moves a sleeve. The movement allows the dog clutch of the sleeve to be locked with the dog clutch of an outer differential casing. The locking allows outer and inner differential casings to be coupled to each other. The coupling allows four-wheel drive. The contracting of the cylinder moves the sleeve in the opposite direction. This movement allows the dog clutch to be disengaged. The disengagement allows two-wheel drive.

SUMMARY OF THE INVENTION

The clutch, however, needs a large-sized actuator when driving under fluid pressure such as air or hydraulic pressure, and especially, when driving on a high land under fluid pressure dependent on air pressure.

The switching between two and four wheel drives needs a sliding portion. The sliding produces a sliding resistance, which could influence output torque.

The invention is directed to a clutch system and a differential with the clutch system, which reduce a sliding resistance and multiply output torque, without a large-sized actuator.

The first aspect of the invention is directed to a clutch system. The clutch system includes a clutch for being displaced to establish engagement thereof. The clutch system includes an actuator for operating the clutch. The actuator includes a solenoid. The actuator includes a plunger driven by the solenoid for giving a displacement to the clutch.

The second aspect of the invention is directed to a differential employing the clutch system. The differential includes a rotatable driving member. The differential includes a differential mechanism driven by the driving member. The clutch interlocks the driving member and the differential mechanism with each other.

Preferably, the clutch includes a first clutch component rotatable with the driving member. The clutch includes a second clutch component rotatable with the differential mechanism for engaging with the first clutch component.

Preferably, the differential mechanism includes a pinion shaft fixed to the second clutch component.

Preferably, the differential mechanism comprises a side gear integral with the second clutch component.

Preferably, the plunger includes a driver. The plunger includes a follower movable by the driver for displacing the first clutch component.

Preferably, the driver is centered on the follower.

Preferably, the driving member includes a supporting part for supporting an axle. The follower is centered on the supporting part.

Preferably, the solenoid includes a coil housing movably supporting the plunger.

Preferably, the coil housing and the plunger are sealed to each other.

Preferably, the differential further includes a carrier housing rotatably supporting the driving member. The actuator includes a stopper for stopping the solenoid from rotating relative to the carrier housing.

Preferably, the driving member includes a supporting part for supporting an axle. The carrier housing rotatably supports the supporting part. The actuator is supported on the supporting part within the radially outermost of the driving member.

Preferably, the driving member comprises a wall defining a hole therethrough. The first clutch component comprises a protrusion inserted into the hole.

The differential further includes a cam mechanism for establishing an axial displacement between the first clutch component and the driving member. The cam mechanism includes a first cam side on the wall. The cam mechanism includes a second cam side on with the protrusion. First and second cam sides are inclined to an axis for cooperatively sliding on each other.

Preferably, the driving member includes a supporting part for supporting an axle. The follower is supported by the supporting part. The driver is supported by the follower.

Preferably, the driving member includes a supporting part for supporting an axle. The driver is supported by the supporting part.

Preferably, the solenoid includes a coil housing supported by a carrier housing supporting the driving member. The follower is supported by the coil housing. The driver is supported by the follower.

Preferably, the driving member includes a supporting part for supporting an axle. The solenoid includes a coil housing supported by the supporting part. The follower is supported by the coil housing. The driver is supported by the follower.

Preferably, the follower includes a non-magnetic material.

DETAILED DESCRIPTION OF THE PREFERRED EMBODIMENTS

The embodiments of the invention will hereby be described with reference to the drawings.

First Embodiment

Figure 1:
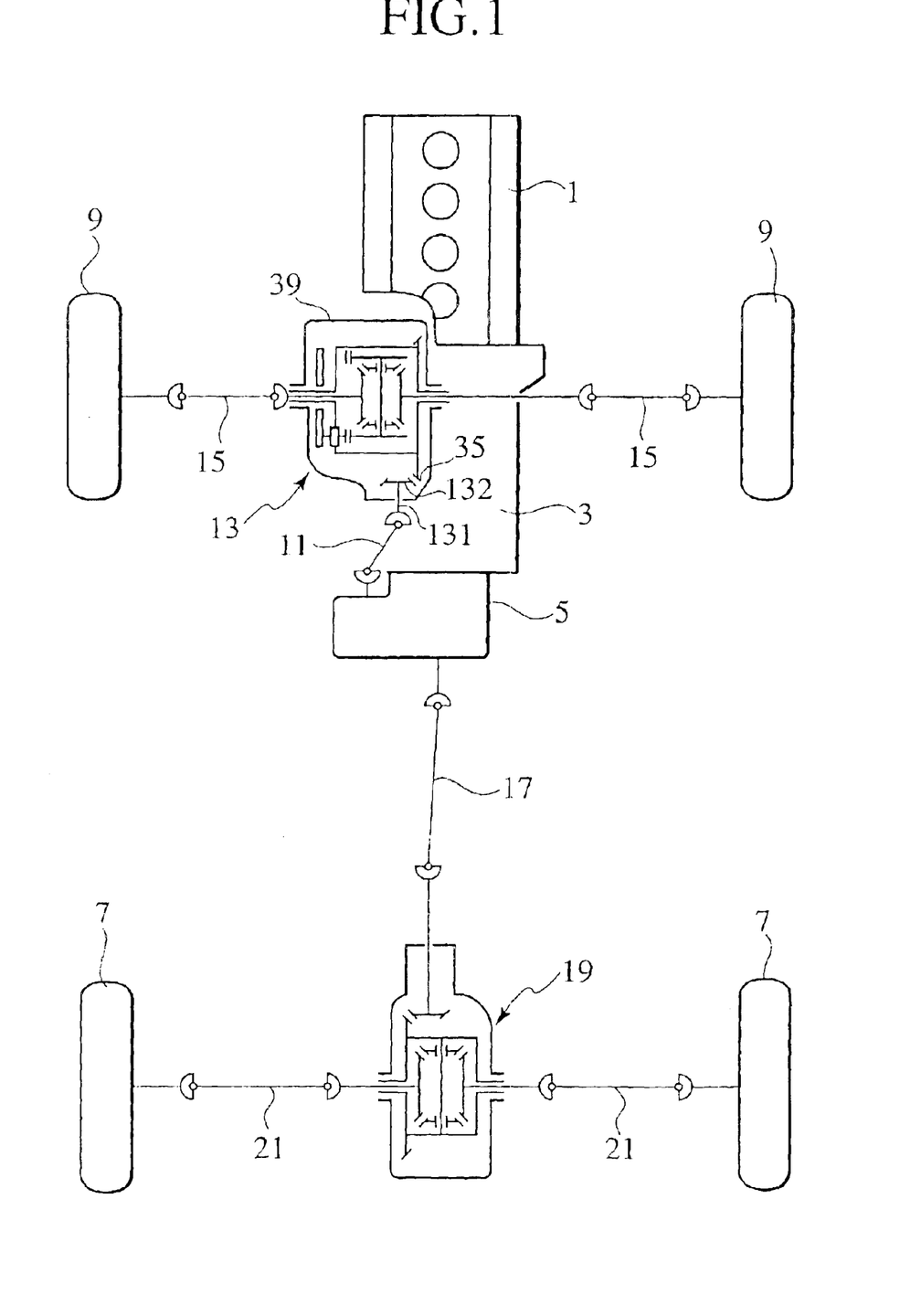
FIG. 1 is a skeleton view illustrating a power train of a vehicle, which employs the differential according to the first embodiment.

In FIG. 1, the power train is adapted, for example, to a part-time four-wheel vehicle, based on a rear-wheel vehicle. The differential of the invention is adapted to a front differential 13 of the vehicle. The differential may be adapted to a rear or center differential.

Engine 1 produces driving-torque, which is distributed to front and rear wheels 7 and 9 through transmission 3 and transfer 5. The driving-torque for front wheels 9 is inputted into front differential 13 through propeller shaft 11. The input is distributed to both front output axles 9 to drive front wheels 9. The driving-torque for rear wheels 7 is inputted into rear differential 13 through propeller shaft 17. The input is distributed to both rear output axles 21 to drive rear wheels 7.

Transfer 5 includes gears, chains or a center differential for distributing driving-torque to front and rear wheels 7 and 9 through propeller shaft 11, 17.

Figure 2:
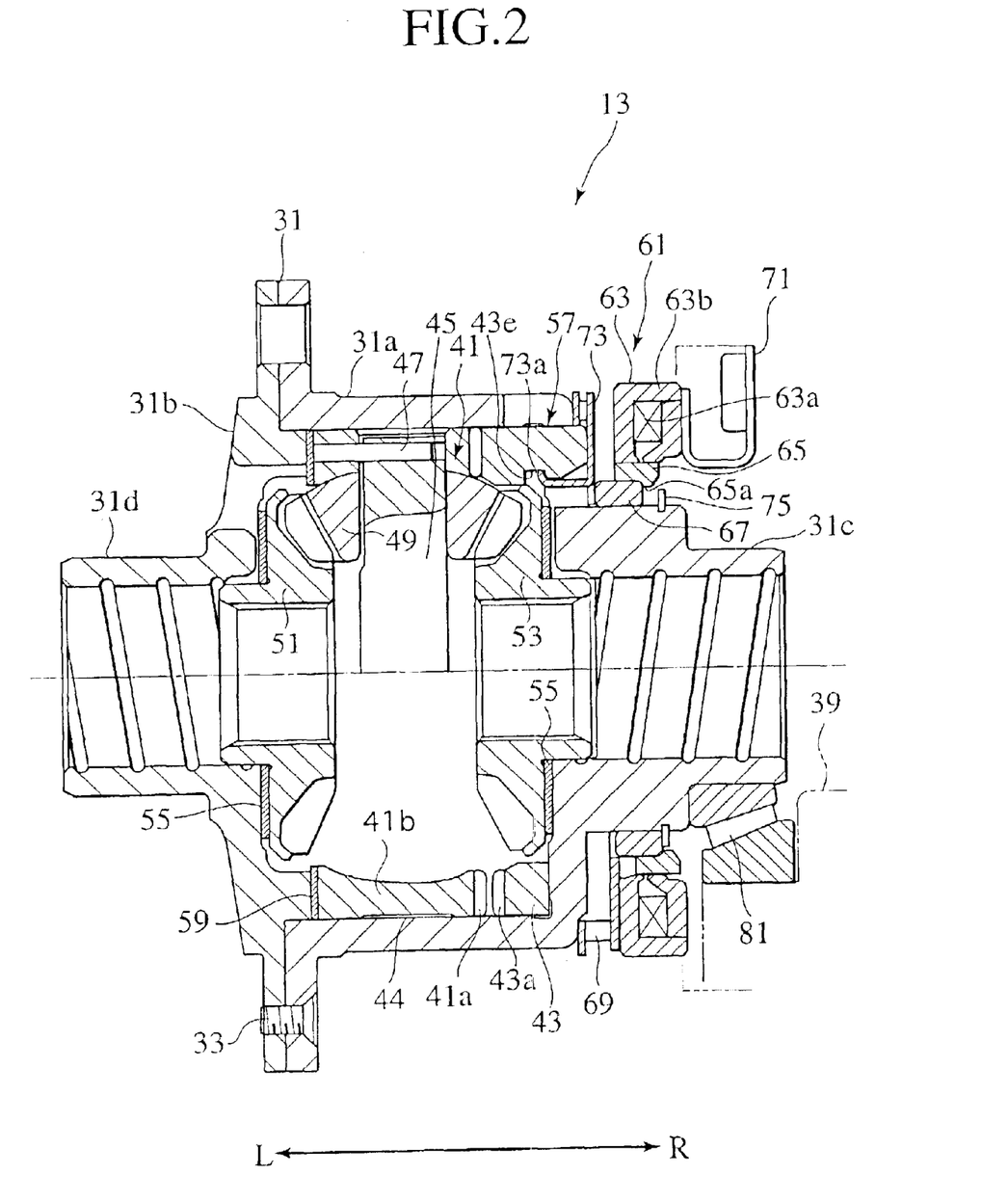
FIG. 2 is a sectional view illustrating the differential in FIG. 1.

In FIG. 2, differential 13 includes outer differential casing 31. Casing 31 includes primary casing 31a and cover 31b, fixed to each other by bolt 33. Casing 31 includes ring gear 35 fixed thereto (refer to FIG. 1). Driving-torque from engine 1 is inputted into ring gear 35 through a drive pinion or shaft 131 and bevel gear 132.

Casing 31 has bosses or supporting parts 31c and 31d at both ends, which are rotatably supported to stationary carrier housing 39 (refer to FIG. 1). Supporting parts 31c and 31d and housing 39 have taper roller bearings 81 interposed therebetween.

Casing 31a has an inner periphery, which coaxially rotatably supports short cylindrical inner differential casing or first clutch ring 41. Clutch ring 41 has a peripheral channel 44 with a width on the outer periphery. Ring 41 has both ends outside channel 44, which are slidably supported on casing 31a. Ring 41 rotates relative to casing 31a. Ring 41 has neighboring short cylindrical clutch member or second clutch ring 43 located on the right. Clutch rings 41 and 43 constitute a dog clutch. Clutch rings 41 and 43 may be employ a sliding clutch.

Clutch rings 41 and 43 have opposed sides, which include engagable or disengagable radial teeth or clutch 41a and 43a, respectively. Teeth 41a and 43a include meshable projections, which are tapered at an inclination for improving meshablity.

Clutch ring 41 has pinion shaft 45 normal to the axis. Ring 41 is integrated with pinion shaft 45 by spring pin 47. Shaft 45 has two rotatable pinion gears 49 (one of them is omitted in FIGS.). Gears 49 are meshed with a pair of opposed side gears 51, 53.

Clutch ring 41 has inner peripheral surface 41b, which is subjected to a thrust from pinion gear 49. Gears 51 and 53 and casing 31 have washers 55 interposed therebetween, respectively, which are subject to a thrust from side gears 51, 53. The left end surface of ring 41 and the opposed surface of casing 31 have receiving washer 59 interposed therebetween. Washer 59 is subjected to a thrust, when teeth 41a and 43a are meshed with each other.

Side gears 51 and 53 are splined to output axles 15 in FIG. 1, respectively. The differential mechanism 57 of clutch ring 41 and side gears 51 and 53 is not directly linked to casing 31 that houses mechanism 57.

Figure 3A:
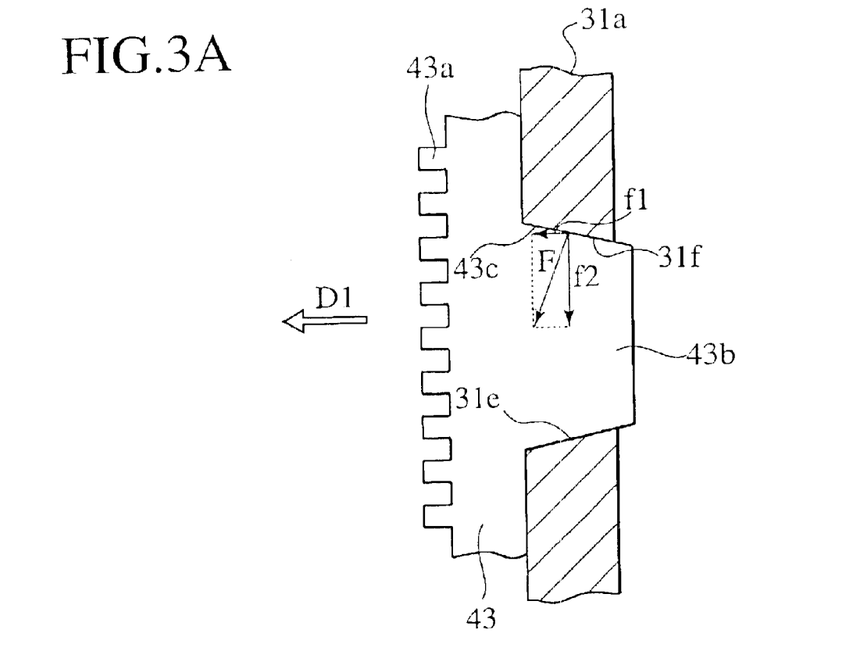
FIGS. 3A and 3B are a sectional view illustrating a cam mechanism of the clutch ring and the outer differential casing in FIG. 2.
Figure 3B:
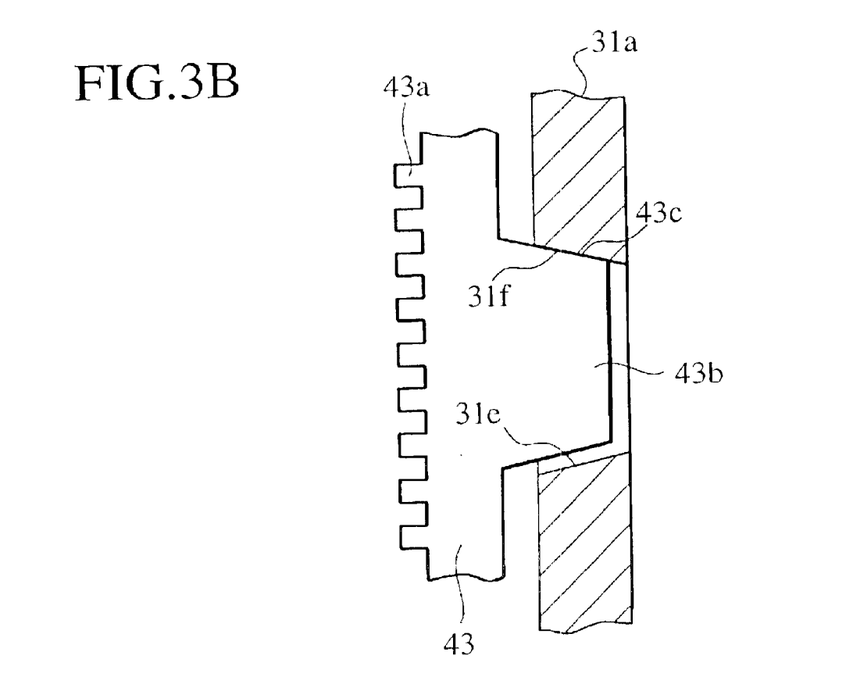

In FIGS. 3A and 3B, clutch ring 43 has four sectorial legs 43b, which project from the end surface opposite to tooth 43a and are arranged at an equal angle in a peripheral direction. Legs 43b have peripherally both end surfaces or outer walls 43c, which are tapered axially outward or rightward at an inclined angle relative to the axis.

Casing 31a has a right end wall with sectorial holes 31e, which are located in correspondence with legs 43b, respectively. Legs 43b are fitted axially into holes 31e. Outer walls 43c sildably contact with end edges or inner walls 31f that define holes 31e. Inner walls 31f are inclined in parallel with outer walls 43c. Outer and inner walls 31f and 43c constitute a cam mechanism. Casing 31a normally rotates together with clutch ring 43.

Clutch ring 43 is axially and movably mated with casing 31. When clutch rings 43 rotate together with casing 31, rings 43 are pressed by casing 31a under a centrifugal force. In FIG. 3B, rings 43 with inclined walls 43c are pushed by casing 31a in the direction of D1 in FIG. 3 to be displaced toward clutch ring 41. Specifically, outer walls 43c are pressed by inner walls 31f under reaction F. The reaction has an axial component f1 and a radial component f2. Outer walls 43c slide on inner walls 31f under the component f1 to be displaced in the direction of D1. The cam mechanism facilitates the engagement of teeth 41a and 43a.

In FIG. 2, Differential 13 has actuator 61 disposed outside casing 31 on the right. Actuator 61 includes annular electromagnetic solenoid 63, a plunger with annular magnetic substance 65 and non-magnetic substance 67, pressure ring 73 and return spring 69.

Solenoid 63 includes coil 63a. Solenoid 63 includes coil-housing 63b, which covers coil 63a from the outside. Solenoid 63 is fixed to a vehicle body by bracket 71. Entire annular solenoid 63 encloses cylindrical supporting part 31c on the right of casing 31a.

In the structure, solenoid 63 establishes magnetic path with sectional area in opposition to coil housing 63b in order to easily produce or to stabilize the magnetic field during engagement of clutch 41a, 43a.

During initial operation of solenoid 63, coil 63a is energized at great current substantially from 2 A to 5 A. During engagement of clutch 41a and 43a, coil 63a is energized at small current substantially from 0.1 A to 1.0 A. Solenoid 63 during engagement of clutch is under a condition where a driver successively engages or disengages the clutch 41a, 43a with disengagement or engagement. The sufficient energization at small current during the initial operation restrains deterioration of coil 63a in function during the engagement of clutch 41a and 43a to stabilize engagement or disengagement of clutch 41a and 43a. This reduces power consumption remarkably to restrain the load of electric power on a battery.

Annular magnetic substance 65 is disposed radially inside of solenoid 63. Magnetic substance 65 has inner peripheral surface mounted on non-magnetic substance 67 in engagement. Magnetic substance 65 has the inner peripheral surface with projection 65a, which engages with non-magnetic substance 67. The engagement centers magnetic substance 65 on non-magnetic substance 67 from the outside.

Non-magnetic substance 67 contacts with the outer peripheral surface of supporting part 31c, with it 67 centered on supporting part 31c. The engagement of substance 65 with the outer peripheral surface of substance 67 indirectly centers substance 65 on supporting part 31c, with substance 67 interposed between substance 65 and supporting part 31c. Substance 67 may employ magnetic material.

Solenoid 63, magnetic substance 65, and non-magnetic substance 67 as a ring are centered on supporting part 31c. This structures entire actuator 61 coaxial with output axle 15 (refer to FIG. 1). Output axle 15 is inserted into supporting part 31c and is splined to side gear 53.

Non-magnetic substance 67 is axially movable forward and backward on supporting part 31c, contacting the outer peripheral surface of supporting part 31c. In order to prevent non-magnetic substance 67 from coming off supporting part 31c by the movement, supporting part 31c is mounted with stopper plate 75.

Non-magnetic substance 67 and clutch ring 43 have retainer or pressure ring 73 located therebetween. Pressure ring 73 abuts against legs 43b of clutch ring 43 (refer to FIGS. 3A and 3B). The abutment operates pressure ring 73 to press and move clutch ring 43 in a direction for engaging of clutch 43a and 41a.

Pressure ring 73 is bent axially of clutch ring 43 and is radially raised to form latch 73a. Pressure ring 73 is latched with recess 43e of clutch ring 43 at latched 73a. The latch allows teeth 41a and 43a to be disengaged, as pressure ring 73 moves with clutch ring 43, while moving away from casing 41.

Pressure ring 73 and casing 31a have return spring 69 interposed therebetween. Spring 69 biases pressure ring 69 in a direction to disengage teeth 41a and 43a. During de-energization or demagnetization of solenoid 63, spring 69 disengages clutch 41a and 43a.

In the upper-half part of FIG. 2, clutch 41a, 43a engages (four-wheel drive). In the lower-half part of FIG. 2, clutch 41a, 43a disengages (two wheel drive).

When solenoid 63 is energized, a magnetic path passes through coil housing 63b and magnetic substance 65. Solenoid 63 moves substance 65 axially leftward L under the magnetic path. The substance 65 and non-magnetic substance 67 move together in this direction to press pressure ring 73. The press moves clutch ring 43 leftward to engage teeth 41a and 43a with each other.

The engagement allows casing 31 and clutch ring 41 to be rotated together via clutch ring 43 (four-wheel drive). During the engagement of teeth 41a and 43a, washer 59 contacts and receives clutch ring 41 under a thrust.

When solenoid 63 is de-energized, spring 69 biases pressure ring 73 to be moved with clutch ring 43 axially rightward R. The movement allows teeth 41a and 43a to be separated from each other. Casing 31 and clutch ring 41 are independently rotatable relative to each other (two-wheel drive).

When four-wheel drive is changed to two-wheel drive, transfer 5 cuts off a driving force from engine 1 toward front wheels 9. Engine 1 drives only rear wheels 7 via propeller shaft 17 and rear differential 19 under driving force.

During two-wheel drive, differential mechanism 67 within front differential 13 is raced by front wheels 9, as torque follows the driving path reverse to the path during four-wheel drive. Change to two-wheel drive interlocks disengagement of clutch 41a and 43a by spring 69. The disengagement prevents the racing of clutch rings 31 and 41 and ring gear 35. This reduces energy loss and noise due to drive-resistance on the racing members.

According to the embodiment, actuator 61 is structured to axially move clutch ring 43 for engagement or disengagement of clutch 41a and 43a. The control of current allows change of drive mode, which achieves a small-sized actuator. No consideration is necessary regarding leakage of a fluid, or no sealant for prevention of fluid from leakage, which reduces the number of components, simplifies the structure, and facilitates assembly.

No actuator to be driven under fluid pressure reduces sliding resistance and influence on output torque.

Annular or ring-shaped actuator 61 is located coaxially with output axle 15, and exerts driving torque with the entire annular shape. This allows clutch ring 43 to be stably driven under a great force. The annular shape allows layout through output axle 15, thus achieving preferable balance.

According to the embodiment, non-magnetic substance 67 on the inner peripheral surface of magnetic substance 65 prevents contact of substance 65 with casing 31 and pressure ring 73. The arrangement prevents leakage of magnetic flux from magnetic path, allowing a magnetic path at a minimum length. No leakage of magnetic flux efficiently produces magnetic path, and needs no great current to be provided to actuator 61, thus reducing electric power.

The centering of magnetic substance 65 on annular substance 67 simplifies the structure for centering of substance 65.

The centering of substance 67 on supporting part 31c needs no member for centering substance 67, which simplifies and miniaturizes the structure.

The cam mechanism 31f and 43c between casing 31a and clutch ring 43 secures engagement of clutch 41a and 43a.

Second Embodiment

The embodiment has members with the identical reference characters in correspondence with the first embodiment.

Figure 4:
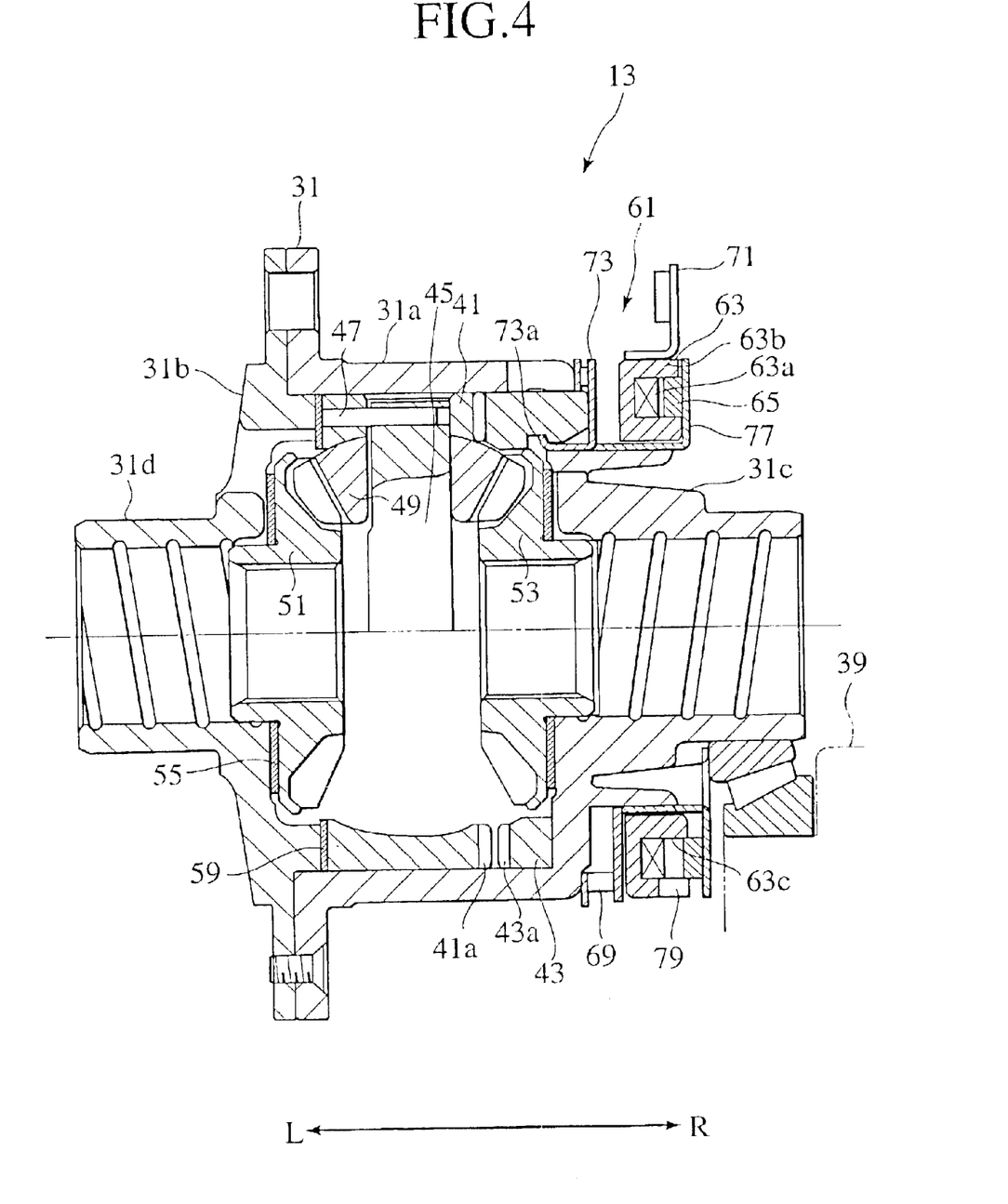
FIG. 4 is a sectional view illustrating the differential according to the second embodiment.

In FIG. 4, actuator 61 includes electromagnetic solenoid 63 with coil housing 63b in a U-shaped section. Housing 63b has the opening end surface farther from clutch ring 43. Pressure ring 73 integrally includes supporting plate 77 extending away from clutch ring 43. Plate 77 has magnetic substance 65 mounted thereon.

Annular magnetic substance 65 is fixed to plate 77 with the side which faces clutch ring 43. Magnetic substance 65 is dimensioned to enter into or come out of opening 63c of coil housing 63. Substance 65 is located on plate 77, corresponding to opening 63c.

Coil housing 63b partially has outlet 79 for discharging air or oil.

Return spring 69 is disposed between pressure ring 73 and casing 31. Spring 69 biases pressure ring 73 in a direction to disengage teeth 41a and 43a from each other. During de-energization or non-driving of solenoid 63, spring 69 disengages teeth 41a and 43a from each other.

In the upper-half of FIG. 4, clutch 41a and 43a are engaged (four-wheel drive). In the lower-half part of FIG. 4, clutch 41a and 43a are disengaged (two-wheel drive).

When solenoid 63 is energized, a magnetic path passes through coil housing 63b and magnetic substance 65. Solenoid 63 moves substance 65 to the axially leftward L under magnetic force. The movement allows plate 77 and pressure ring 73 to be moved together in the identical direction. This allows clutch ring 43 to be moved leftward L and teeth 41a and 43a to be engaged with each other. The engagement allows casing 31 and clutch ring 41 inside thereof to be rotated together, using clutch ring 43 (four-wheel drive). During engagement of clutch 41a and 43a, washer 59 contacts and receives clutch ring 41 under a thrust.

When solenoid 63 is de-energized, spring 69 biases pressure ring 73 to be moved with clutch ring 43 axially rightward R. The movement allows teeth 41a and 43a to be separated from each other. Casing 31 and clutch ring 41 are independently rotatable relative to each other (two-wheel drive).

According to the second embodiment, during de-energization, disengagement of clutch 41a and 43a allows two-wheel drive, while engagement of clutch 41*a* and 43*a* allows four-wheel drive, if necessary. For example, if solenoid 63 is in trouble, two-wheel drive is ensured to improve drivability on a paved road.

With magnetic substance 65 inserted in opening 63*c*, substance 65 and coil 63*a* have a gap between them. The structure with the gap reduces sliding resistance, allowing less influence on torque by the resistance.

According to the second embodiment, no annular non-magnetic substance (67) reduces the number of components, simplifying the structure. Magnetic substance 65 is structured to enter into coil housing 63, which allows a smaller operating space for miniaturization.

Figure 5:
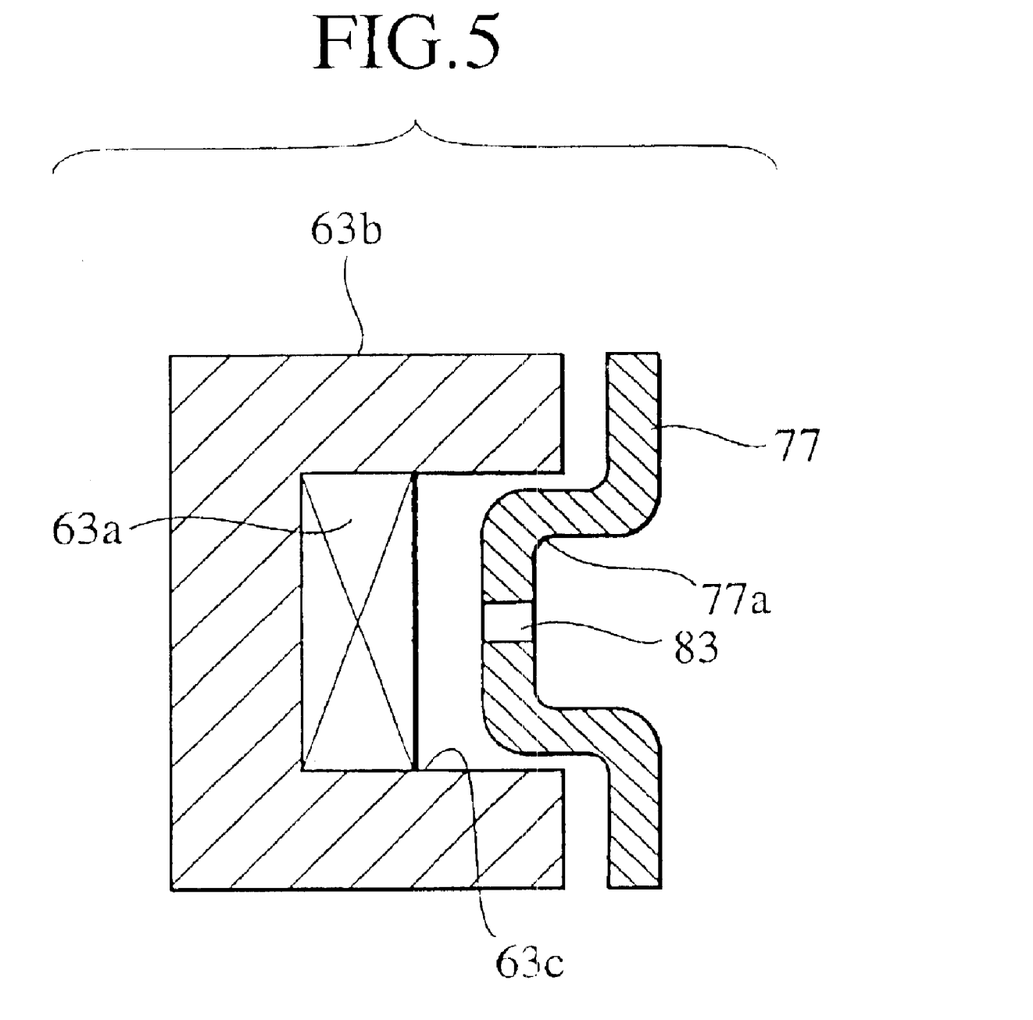
FIG. 5 is a sectional view illustrating the modified embodiment according to the second embodiment.

In FIG. 5, supporting plate 77 has another structure.

Entire plate 77 or pressure ring 73 with plate 77 is made of magnetic material. At the position corresponding to opening 63*c*, projection 77*a* in place of magnetic substance 65 is located to enter into opening 63*c*. Energization of coil 63*a* allows projection 77*a* to be moved in a direction for entering into opening 63*c*. The movement allows engagement of clutch 41*a* and 43*a*.

Projection 77*a* has outlet 83 for discharging air or oil.

Third Embodiment

The embodiment has members with the identical reference characters in correspondence with the second embodiment.

Figure 6:
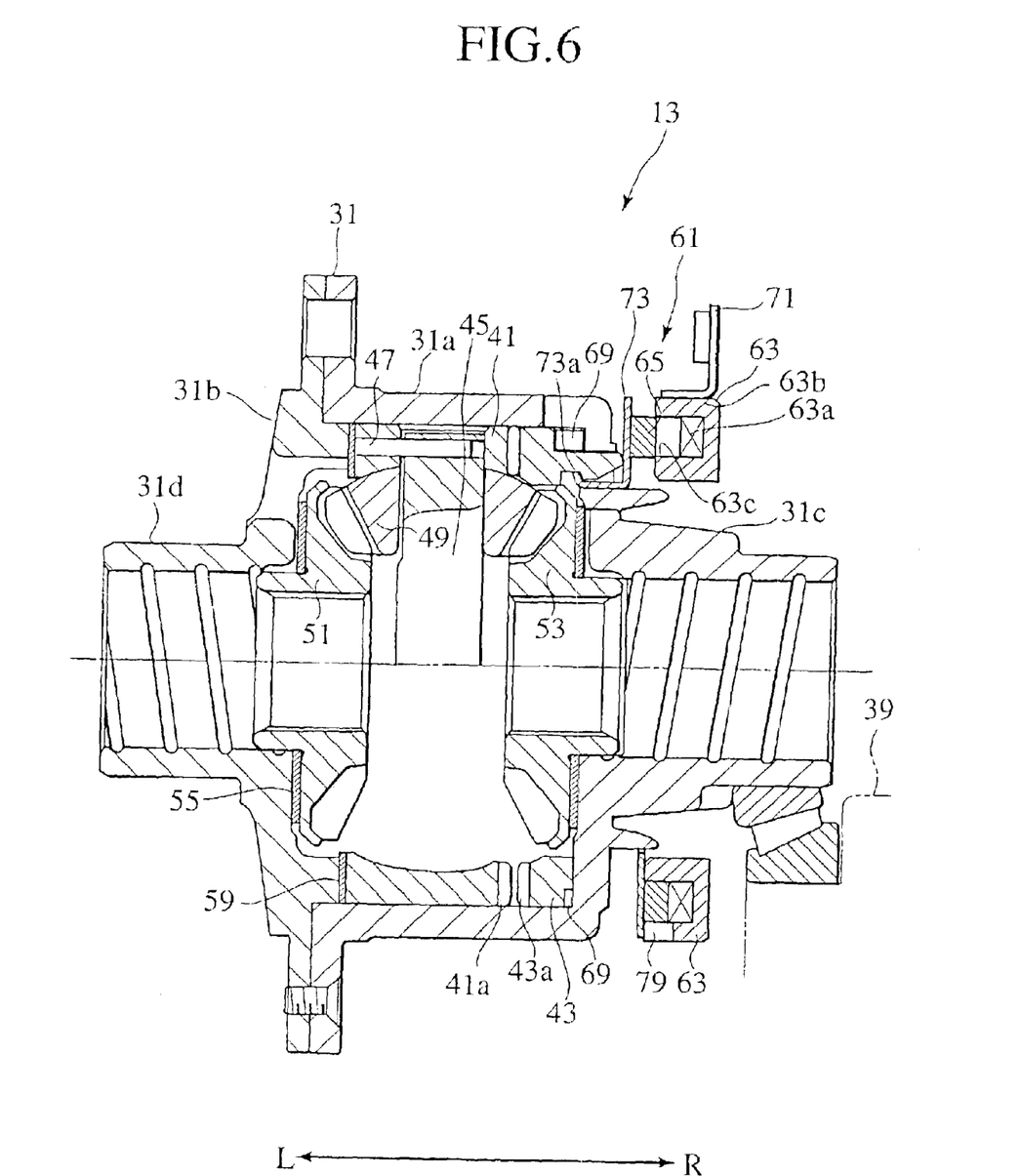
FIG. 6 is a sectional view illustrating the differential according to the third embodiment.

In FIG. 6, actuator 61 includes solenoid 63 with coil housing 63*b* in a U-shaped section. Housing 63*b* has the opening end surface facing clutch ring 43. Pressure ring 73 has annular magnetic substance 65 mounted thereon.

Magnetic substance 65 is dimensioned to enter into or come out of opening 63*c* of coil housing 63, as the second embodiment does. Substance 65 is fixed to pressure ring 73, positionally corresponding to opening 63*c*.

Coil housing 63*b* partially includes outlet 79 for discharging air or oil.

Return spring 69 is interposed between casing 31*a* and clutch ring 43. Spring 69 biases spring 69 in a direction to engage teeth 41*a* and 43*a* with each other. During de-energization of solenoid 63, spring 69 allows teeth 41*a* and 43*a* to be joined with each other.

In the upper-half of FIG. 6, clutch 41*a*, 43*a* engages (four-wheel drive). In the lower-half part of FIG. 6, clutch 41*a*, 43*a* disengages (two-wheel drive).

During de-energization of solenoid 63, spring 69 biases clutch ring 43 with pressure ring 73 axially leftward L. This allows teeth 41*a* and 43*a* to remain in engagement. The engagement allows casing 31 and clutch ring 41 to be rotated together, using clutch ring 43 (four-wheel drive). During engagement of clutch 41*a* and 43*a*, washer 59 contacts and receives clutch ring 41 under a thrust.

During energization of solenoid 63, a magnetic path passes through coil housing 63*b* and magnetic substance 65. Solenoid 63 moves substance 65 to the axially rightward R under magnetic force. The movement allows plate 77 and pressure ring 73 to be moved together in an identical direction. This allows clutch ring 43 to be moved rightward R and teeth 41*a* and 43*a* to be separated from each other. The engagement allows casing 31 and clutch ring 41 inside thereof to be independently rotated relative to each other (two-wheel drive).

According to the embodiment, during de-energization engagement of teeth 41*a*, 43*a* allows four-wheel drive, while disengagement of teeth 41*a* and 43*a* allows two-wheel drive, if necessary. For example, if solenoid 63 is in trouble, four-wheel drive is ensured to improve drivability on a rough road.

With magnetic substance 65 inserted in opening 63*c*, substance 65 and coil 63*a* have a gap between them, as the second embodiment does. The structure with the gap reduces sliding resistance, allowing less influence on torque by the resistance.

No annular non-magnetic substance 67 reduces the number of components, simplifying the structure. Magnetic substance 65 is structured to enter into coil housing 63, which allows a smaller operating space smaller for miniaturization.

Entire pressure ring 73 may be made of magnetic material, and may have a projection (77*a*) positioned corresponding to opening 63*c* for entering into opening 63*c*, as the second embodiment does.

Fourth Embodiment

Figure 7:
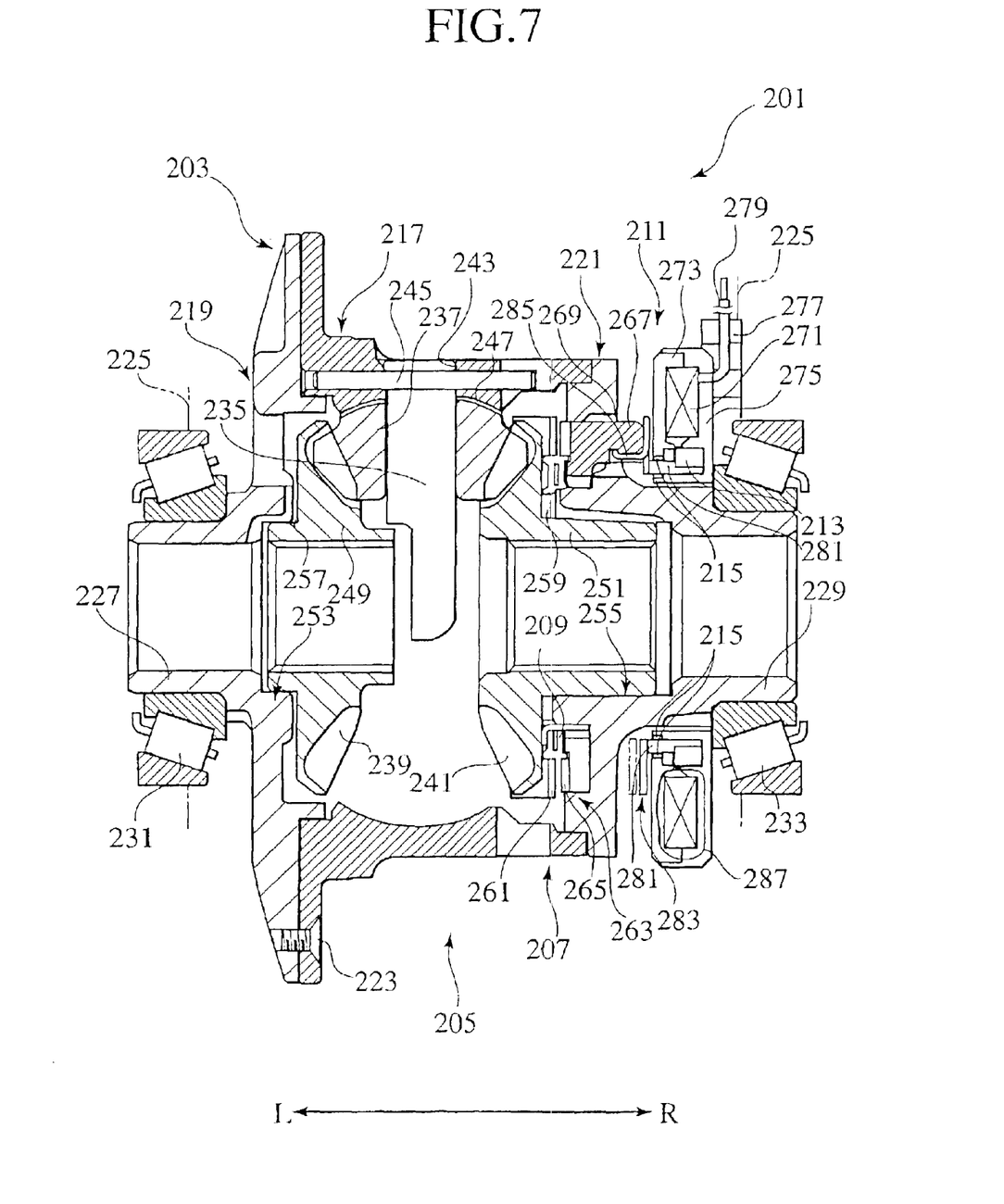
FIG. 7 is a sectional view illustrating the differential according to the third embodiment.

In FIGS. 7, differential 201 is adapted to front wheels of a front-wheel drive vehicle, or to rear wheels of a rear-wheel drive vehicle.

Differential 201 includes differential casing 203, bevel gear type differential mechanism 205, dog clutch 207, return spring 209, electromagnetic solenoid 211, magnetic substance 213, and O-ring (sealant) 215.

Casing 203 includes primary casing 217, left and right covers 219 and 221. Casing 217 and left cover 219 are fixed to each other by bolt 223. Casing 217 and right cover 221 are welded to each other.

Casing 203 is located inside of carrier housing 225. Cover 219 and 221 includes supporting parts 227 and 229, respectively, which are rotatably supported on housing 225, using taper roller bearing 231 and 233.

Housing 225 has an oil reservoir inside thereof.

Casing 203 has ring gear 35 (refer to FIG. 1) fixed thereto by a bolt, with ring gear 35 engaging with an output bevel gear 132 of a power train. The power train is linked to a transfer. Casing 203 is rotated by an engine under a driving torque, which is transmitted via the transfer and the power train.

Differential mechanism 205 includes pinion shaft 235. Mechanism 205 includes pinion gear 237 rotatably supported on shaft 235. Mechanism 205 includes side gears 239 and 241 for output.

Shaft 235 has an end, which engages with through-hole 243 of casing 203 (primary casing 217), with shaft 235 and casing 203 fixed by pin 245. Side gears 239 and 241 engage with pinion gear 237 from the left and right, respectively.

Casing 203 and pinion gear 237 has spherical washer 247 interposed therebetween. Washer 247 is subjected to a centrifugal force from pinion gear 237. Washer 247 is subjected to a repulsive force, which is produced by engagement of side gears 239 and 241.

Side gears 239 and 241 include supporting parts 249 and 251 supported by supporting parts 253 and 255 of covers 219, 221. Supporting parts 249 and 251 are splined to axles and are connected to left and right wheels, respectively.

Left side gear 239 and casing 203 have thrust washer 257 interposed therebetween. Washer 257 receives side gear 239 under an engaging thrust. Right side gear 241 and casing 203 have thrust washer 259 interposed therebetween. Washer 259 receives side gear 241 under an engaging thrust.

Dog clutch 207 includes engaging tooth 261 structured to right side gear 241. Clutch 207 includes engaging tooth 265 structured to clutch ring 263.

Clutch ring 263 includes legs 267 at an equal angle in a peripheral direction. Cover 221 has openings 269 at an equal angle in a peripheral direction. Each of legs 267 passes through opening 269 to stop the rotation relative to casing 203, and is axially movable in opening 269.

When clutch ring 263 moves leftward L, clutch 207 is engaged to lock differential mechanism 205 under differential motion. When ring 263 moves rightward R, clutch 207 is disengaged to unlock mechanism 205.

Return spring 209 is interposed between right side gear 241 and clutch ring 263. Spring 209 biases ring 263 axially rightward R to disengage clutch 207.

Solenoid 211 includes electromagnetic coil 271. Solenoid 211 includes a pair of coil housings 273, 275, which have coil 271 interposed therebetween for integration.

Coil housing 275 is fixed to housing 225, using connecting member 277. Coil 271 includes 279, which is drawn outside of housing 225, and is connected to a battery on a vehicle via a controller.

Magnetic substance 213 is axially movable within coil housing 273 and 275. Substance 213 has pressing parts 281 at an equal angle in a peripheral direction. Each of pressing parts 281 passes through housing 273 via O-ring 215 to project leftward L.

Clutch ring 263 presses each of pressing parts 281 with magnetic substance 213 rightward, using sliding plate 283. Plate 283 is linked to rotary (input) clutch ring 263 by arm 285, which allows slide between plate 283 and magnetic substance 213 (pressing parts 281).

Coil housings 273 and 275 and magnetic substance 213 constitute the magnetic path of solenoid 211. Magnetic substance 213 serves as an armature.

The controller operates solenoid 211 to be magnetized or demagnetized.

During magnetization of solenoid 211, magnetic loop 287 occurs through the magnetic path. Magnetic substance 213 moves leftward L to flex spring 209. Magnetic substance 213 moves clutch ring 263 to engage clutch 207. This locks differential mechanism 205 under differential motion.

Differential motion is locked under a condition where wheel-spin is easily given to left and right wheels, such as driving on rough ground. The lock prevents relief of a driving torque from wheels under wheel-spin, thus improving drivability on and escapability from rough road.

When solenoid 211 is demagnetized, spring 209 returns clutch ring 263 and magnetic substance 213 rightward R to disengage clutch 207.

According to the embodiment, solenoid 211 is structured to axially move clutch ring 263 for engagement or disengagement of clutch 207. The structure has change of drive by control of current, achieving a small-sized actuator. The structure needs no consideration regarding leakage of fluid, and needs no sealant for prevention of fluid leakage. This reduces the number of components, which simplifies the structure and facilitates assembly.

No sliding portion, as an actuator drives under fluid pressure, reduces sliding resistance, allowing less influence on output torque.

Annular solenoid 211 is located coaxially with differential 201 or an axle, and exerts driving torque with the entire annular shape. This allows clutch ring 263 to be driven under a great force, thus stabilizing drive. The annular shape allows layout through the output axle, thus achieving preferable balance.

According to the embodiment, magnetic substance 213 is housed within coil housings 273, 275 of solenoid 211. Coil housings 273, 275 supported on housing 225 has no contact with casing 203. This prevents leakage of magnetic flux, allowing a magnetic path at a minimum distance.

No leakage of magnetic flux efficiently produces a magnetic path, and need no great current to be provided to solenoid 211, thus saving the electric power of a battery.

The supporting of magnetic substance 213 on coil housings 273 and 275 serves to adjust clearance between coil housings 273 and 275 and magnetic substance 213, which minimizes loss of magnetic force and sliding resistance between housings 273 and 275 and substance 213.

The centering of magnetic substance 213 on coil housing 273 and 275 simplifies the structure for centering of substance 213.

O-rings 215, interposed housing 273 and magnetic substance 213 (pressing part 281), prevents contamination such as a magnetic metallic powder in oil, from attraction to coil 271. This prevents inadequate movement of magnetic substance 213 due to the filling effect of the magnetic metallic powder, and inadequate operation of clutch 207, which ensures a normal mechanism in the long term.

Coil housings 273, 275 may be supported on housing 203, using a bearing.

Fifth Embodiment

Figure 8A:
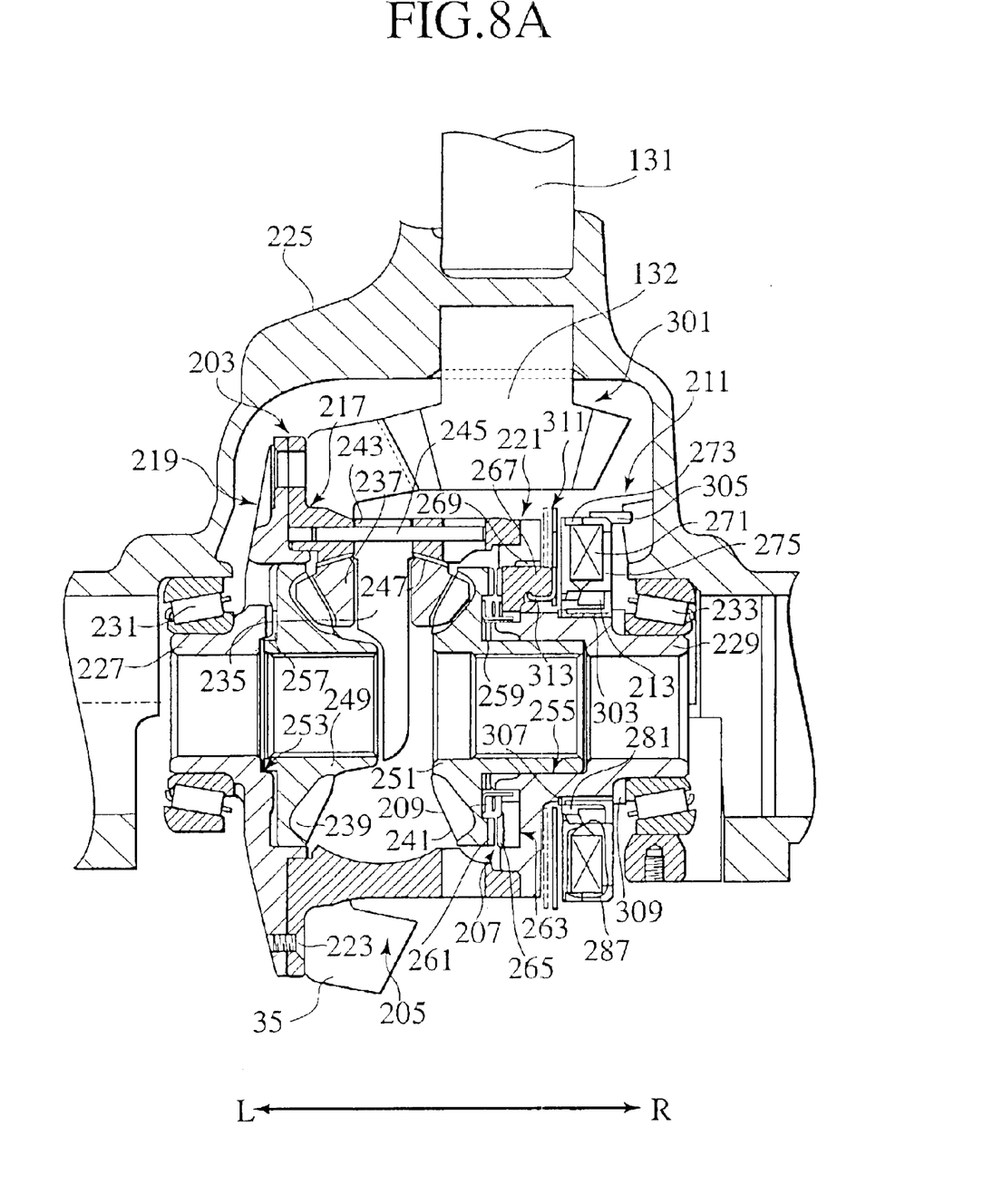
FIG. 8A is a sectional view illustrating the differential according to the third embodiment.
Figure 8B:
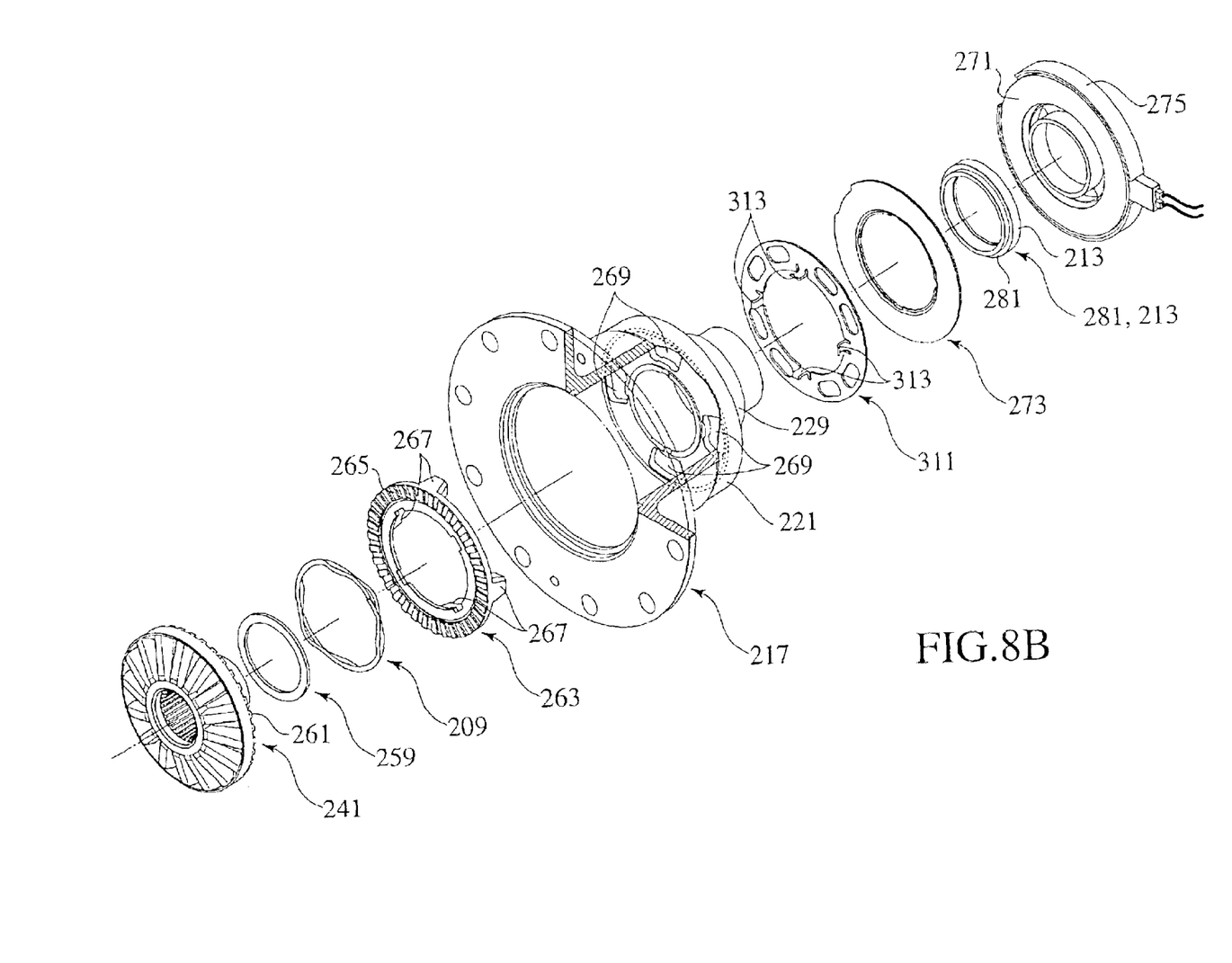
FIG. 8B is an exploded perspective view illustrating the primary part of the differential in FIG. 8A.

In FIGS. 8A and 8B, differential 301 has a modification of a supporting structure of solenoid 211 according to the fourth embodiment.

The embodiment is described in difference from differential 201, with the identically functional members cited with the identical reference characters.

Solenoid 211 is rotatably supported and centered on the outer periphery of right supporting part 229 of casing 203, using non-magnetic sliding bearing 303. Solenoid 211 is connected to carrier housing 225 for stopping of rotation, using bracket 305 (rotation-stopping system).

Solenoid 211 (sliding bearing 303) is axially located by snap ring 307 on supporting part 229 and washer 309 disposed on the left of taper roller bearing 233.

Supporting part 229 (small radial part) has solenoid 211 fixed, which is located within the axially projected region of casing 203.

Dog clutch 207 has annular clutch ring 263 connected to pressure ring 311 by arm 313. When solenoid 211 is magnetized, magnetic loop 287 occurs on magnetic path. Magnetic substance presses clutch ring 263 leftward L, using pressure ring 311. The press engages clutch 207 to lock differential mechanism 205 under differential motion.

When solenoid 211 is demagnetized, spring 209 presses and returns clutch ring 263, pressure ring 311, and magnetic substance 213 rightward R. The press disengages clutch 207, to unlock differential lock.

In general, where an electromagnetic solenoid (actuator) is fixed to a carrier housing for stopping of rotation, adjustment of backlash between ring gear 35 fixed to a differential casing and a mating gear moves a carrier housing. The movement or error of assembly by itself varies distance between a clutch connected to a differential casing and a solenoid connected to carrier housing.

The stroke of the solenoid needs allowance for variation of distance between the solenoid and the clutch of the differential casing. The allowance needs a solenoid with a great actuating power. This causes the solenoid to become larger and heavier, which raises production cost and lowers the differential in vehicle-equipability.

The large-sized solenoid increases power consumption, which increases load on a battery, reducing an engine's fuel cost.

The large-sized solenoid needs a strengthened bracket that fixes the solenoid to the carrier housing. This causes the bracket to become heavier, increasing production cost.

Both fixing and stopping of the rotation of the solenoid, using the carrier housing, needs adjustment of the relative position between the solenoid of the carrier housing and the clutch of the differential casing, which causes difficulties in assembly.

According to differential 301 of the fifth embodiment, solenoid 211 is fixed to casing 203 (supporting part 229). If ring gear 35 connected to casing 203 and output gear 132 connected to a power train is adjusted in backlash or produces an assembly error therebetween, solenoid 211 moves together with casing 203. This movement allows no variation in distance between solenoid 211 and casing 203.

Thus, the stroke of solenoid 211 needs no allowance for variation of the distance, and solenoid 211 needs no magnification of actuating force. This prevents the enlargement and weigh-gain of solenoid 211, raising of production cost, and lowering of differential 301 in vehicle-equipability.

The embodiment prevents an increase of power consumption of solenoid 211, increase of load on a battery, and deterioration of an engine's fuel cost.

The embodiment allows sufficient adjustment between ring gear 35 of casing 203 and output gear 132. The adjustment establishes normal engagement, which prevents gear noise and vibration, thus improving durability.

Bracket 305 stops rotation of solenoid 211 relative to housing 225. Bracket 305 does not need to have function and strength for fixing of solenoid 211 to housing 225, thus allowing lighter weight and lower production cost.

Differential 301 has a structure where solenoid 211 is fixed to casing 203. The structure, different from one where a solenoid is fixed to a carrier housing, needs no adjustment of the relative position between a solenoid of a carrier housing and a clutch of a differential casing. The rotation-stopping measure in the structure is achieved by engagement of bracket 305 with carrier housing 305 during the assembly, which allows remarkably easy assembly.

Solenoid 211 is centered on differential casing 203, with sliding bearing 303 between them. Thus, for example, centering on annular substance 67 in the first embodiment is unnecessary, which reduces the number of components and simplifies the structure.

Solenoid 211 is fixed on supporting part 229 (smaller radius part), and is located within axially projected region of differential casing 203 for efficient utilization of space. Thus, differential 301 becomes a compact structure, thus further improving vehicle-equipability.

The entire contents of Japanese Patent Application P2002-053714 (filed on Feb. 28, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A differential comprising:
a rotatable driving member;
a differential mechanism driven by the driving member;
a clutch for being displaced to establish engagement thereof, wherein the clutch interlocks the driving member and the differential mechanism with each other, said clutch comprising a first clutch component rotatable with the driving member and a second clutch component rotatable with the differential mechanism for engaging the first clutch component; and
an actuator for operating the clutch, said actuator comprising a solenoid and plunger driven by the solenoid for giving a displacement to the clutch, said plunger comprising a driver and a follower movable by the driver for displacing the first clutch component,
wherein the differential mechanism comprises a pinion shaft fixed to the second clutch component and a side gear integral with the second clutch component,
wherein the driving member comprises a supporting part for supporting an axle, and wherein the follower is centered on the supporting part.

2. The differential according to claim 1,
wherein the solenoid comprises a coil housing movably supporting the plunger.

3. The differential according to claim 2,
wherein the coil housing and the plunger are sealed to each other.

4. The differential according to claim 1,
wherein the follower includes a non-magnetic material.

5. A differential comprising:
a rotatable driving member;
a differential mechanism driven by the driving member;
a carrier housing rotatably supporting the driving member;
a clutch for being displaced to establish engagement thereof; and
an actuator for operating the clutch, said actuator comprising a solenoid and plunger driven by the solenoid for giving a displacement to the clutch;
wherein the clutch interlocks the driving member and the differential mechanism with each other, and
wherein the actuator comprises a stopper for stopping the solenoid from rotating relative to the carrier housing.

6. The differential according to claim 5,
wherein the driving member comprises a supporting part for supporting an axle,
the carrier housing rotatably supports the supporting part, and
the actuator is supported on the supporting part within the radially outermost of the driving member.

7. A differential comprising:
a rotatable driving member;
a differential mechanism driven by the driving member;
a clutch for being displaced to establish engagement thereof, wherein the clutch interlocks the driving member and the differential mechanism with each other, said clutch comprising a first clutch component rotatable with the driving member and a second clutch component rotatable with the differential mechanism for engaging the first clutch component; and
an actuator for operating the clutch, said actuator comprising a solenoid and plunger driven by the solenoid for giving a displacement to the clutch;
wherein the driving member comprises a wall defining a hole therethrough, wherein the first clutch component comprises a protrusion inserted into the hole, and wherein the differential further comprises a cam mechanism for establishing an axial displacement between the first clutch component and the driving member, said cam mechanism comprising a first cam side on the wall a second cam side on the protrusion, said first and second cam sides inclined to an axis for cooperatively sliding on each other.

8. A differential comprising:

a rotatable driving member;

a differential mechanism driven by the driving member;

a clutch for being displaced to establish engagement thereof, wherein the clutch interlocks the driving member and the differential mechanism with each other, said clutch comprising a first clutch component rotatable with the driving member and a second clutch component rotatable with the differential mechanism for engaging the first clutch component; and an actuator for operating the clutch, said actuator comprising a solenoid and plunger driven by the solenoid for giving a displacement to the clutch, said plunger comprising a driver and a follower movable by the driver for displacing the first clutch component, wherein the differential mechanism comprises a pinion shaft fixed to the second clutch component and a side gear integral with the second clutch component, wherein the driving member comprises a supporting part for supporting an axle, the follower is supported by the supporting part, and the driver is supported by the follower.

9. The differential according to claim 8, wherein the follower includes a non-magnetic material.

10. A differential comprising:

a rotatable driving member;

a differential mechanism driven by the driving member;

a clutch for being displaced to establish engagement thereof, wherein the clutch interlocks the driving member and the differential mechanism with each other, said clutch comprising a first clutch component rotatable with the driving member and a second clutch component rotatable with the differential mechanism for engaging the first clutch component; and an actuator for operating the clutch, said actuator comprising a solenoid and plunger driven by the solenoid for giving a displacement to the clutch, said plunger comprising a driver and a follower movable by the driver for displacing the first clutch component, wherein the differential mechanism comprises a pinion shaft fixed to the second clutch component and a side gear integral with the second clutch component, wherein the solenoid comprises a coil housing supported by a carrier housing supporting the driving member, the follower is supported by the coil housing, and the driver is supported by the follower.

11. The differential according to claim 10, wherein the follower includes a non-magnetic material.

12. A differential comprising:

a rotatable driving member;

a differential mechanism driven by the driving member;

a clutch for being displaced to establish engagement thereof, wherein the clutch interlocks the driving member and the differential mechanism with each other, said clutch comprising a first clutch component rotatable with the driving member and a second clutch component rotatable with the differential mechanism for engaging the first clutch component; and an actuator for operating the clutch, said actuator comprising a solenoid and plunger driven by the solenoid for giving a displacement to the clutch, said plunger comprising a driver and a follower movable by the driver for displacing the first clutch component, wherein the differential mechanism comprises a pinion shaft fixed to the second clutch component and a side gear integral with the second clutch component, wherein the driving member comprises a supporting part for supporting an axle, the solenoid comprises a coil housing supported by the supporting part, and the follower is supported by the coil housing, and the driver is supported by the follower.

13. The differential according to claim 12, wherein the follower includes a non-magnetic material.

* * * * *